US012671753B2

(12) United States Patent
Li

(10) Patent No.: US 12,671,753 B2
(45) Date of Patent: Jun. 30, 2026

(54) METHOD AND SYSTEM FOR ACHIEVING TIMELY UPDATING OF CLIENT CONFIGURATION

(71) Applicant: Guangdong Genius Technology Co., Ltd., Dongguan (CN)

(72) Inventor: Peng Li, Dongguan (CN)

(73) Assignee: Guangdong Genius Technology Co., Ltd., Dongguan (CN)

( * ) Notice: Subject to any disclaimer, the term of this patent is extended or adjusted under 35 U.S.C. 154(b) by 346 days.

(21) Appl. No.: 18/570,675

(22) PCT Filed: Sep. 13, 2021

(86) PCT No.: PCT/CN2021/117922
§ 371 (c)(1),
(2) Date: Dec. 15, 2023

(87) PCT Pub. No.: WO2023/029079
PCT Pub. Date: Mar. 9, 2023

(65) Prior Publication Data
US 2024/0291911 A1 Aug. 29, 2024

(30) Foreign Application Priority Data
Aug. 31, 2021 (CN) .......................... 202111012080.9

(51) Int. Cl.
*H04L 69/22* (2022.01)
*G06F 8/70* (2018.01)
(Continued)

(52) U.S. Cl.
CPC ............ *H04L 69/22* (2013.01); *H04L 41/082* (2013.01); *H04L 67/34* (2013.01); *G06F 8/70* (2013.01)

(58) Field of Classification Search
CPC .................... H04L 67/34; H04L 69/22; H04L 41/085–0873; H04L 41/082; G06F 8/65–71
See application file for complete search history.

(56) References Cited

U.S. PATENT DOCUMENTS 6,167,567 A * 12/2000 Chiles ........................ G06F 8/65
717/173
6,493,871 B1 * 12/2002 McGuire ................... G06F 8/65
717/172
(Continued)

FOREIGN PATENT DOCUMENTS

CN          102571688 B        7/2014
CN          104125249 A        10/2014
(Continued)

*Primary Examiner* — Brendan Y Higa
(74) *Attorney, Agent, or Firm* — Woodard, Emhardt, Henry, Reeves & Wagner, LLP

(57) ABSTRACT

The invention discloses a method and a system for achieving timely updating of client configuration. The method includes steps: after the client initiates any request to the server, receiving a response message fed back by the server; and obtaining a response header data containing client configuration information from the response message. The response header data includes configuration header data and version header data. Based on the configuration header data, it is determined whether there is an update in the client configuration stored at the server. If there is an update, the configuration at the client is updated based on the version header data. The invention can achieve timely updating of important configurations of the client based on frequent HTTP requests between the client and the server.

4 Claims, 8 Drawing Sheets

(51) Int. Cl.
  *H04L 41/082*   (2022.01)
  *H04L 67/00*   (2022.01)

(56)      References Cited

U.S. PATENT DOCUMENTS

| | | | |
|---|---|---|---|
| 7,913,246 B2 * | 3/2011 | Hammond | G06F 8/65 |
| | | | 709/224 |
| 2002/0086688 A1 * | 7/2002 | Kang | G06F 8/656 |
| | | | 455/445 |
| 2002/0120885 A1 * | 8/2002 | Choi | H04N 21/435 |
| | | | 348/E7.063 |
| 2004/0031029 A1 * | 2/2004 | Lee | G06F 8/65 |
| | | | 717/176 |
| 2009/0063842 A1 * | 3/2009 | Azami | G06F 8/65 |
| | | | 713/2 |
| 2009/0228697 A1 * | 9/2009 | Kurashige | G06F 8/65 |
| | | | 713/100 |
| 2012/0072896 A1 * | 3/2012 | Watanabe | H04N 21/43632 |
| | | | 717/170 |
| 2014/0344797 A1 * | 11/2014 | Rajagopalan | G06F 8/61 |
| | | | 717/169 |
| 2017/0214568 A1 * | 7/2017 | Yang | H04L 41/082 |
| 2019/0342356 A1 | 11/2019 | Thomas et al. | |

FOREIGN PATENT DOCUMENTS

| | | | |
|---|---|---|---|
| CN | 104965721 A | 10/2015 | |
| CN | 107608689 A | 1/2018 | |
| CN | 109240726 A | 1/2019 | |
| CN | 111510466 A | 8/2020 | |
| CN | 112732302 A | 4/2021 | |
| TW | 201501034 A * | 1/2015 | G06F 9/44505 |

* cited by examiner

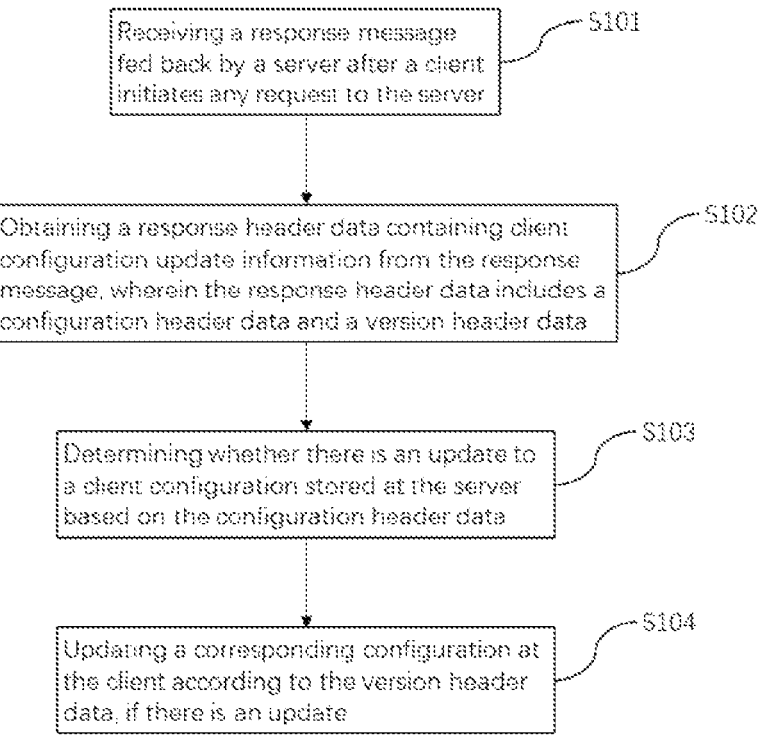

Receiving a response message fed back by a server after a client initiates any request to the server — S101

Obtaining a response header data containing client configuration update information from the response message, wherein the response header data includes a configuration header data and a version header data — S102

Determining whether there is an update to a client configuration stored at the server based on the configuration header data — S103

Updating a corresponding configuration at the client according to the version header data, if there is an update — S104

METHOD AND SYSTEM FOR ACHIEVING TIMELY UPDATING OF CLIENT CONFIGURATION

FIELD OF THE DISCLOSURE

The present application relates to the field of information technology, and particularly to a method and a system for achieving timely updating of client configuration.

BACKGROUND

Applications or hardware devices usually store some important configurations (such as function switches) at the server. If these configurations need to be updated, there are commonly the following approaches:

(1) Restarting the application or device. This method often involves rewriting the code of the application at the client and then restarting the application launcher at the client to complete the updating of the client configuration information;

(2) Triggering through specific operations at the front end. This method usually involves an operation a user preforms when using the app at the client, which causes the client configuration to be updated;

(3) Triggering through scheduled tasks. This method usually configures a request interval at the client. At a configured time, the client sends a request to the server and inquires the server whether the configurations have been changed. The server then gives feedback to the client, to update the configuration if necessary.

All of the above-mentioned methods for client configuration updating have an obvious shortcoming, that the methods are not timely enough. When major online problems occur (for example, a functional module has a risk of crashing), these cannot be handled in a timely manner, which affects user experiences and reduces product reputation.

SUMMARY OF THE INVENTION

To solve the above-mentioned problem of untimely updating of client configuration, the present invention discloses a method and a system for achieving timely updating of client configuration, which can realize timely updating of important client configurations based on frequent HTTP requests between the client and the server. Specifically, the technical solutions of the present invention are hereby described.

On the one hand, this application discloses a method for achieving timely updating of client configuration, which comprises steps: receiving a response message fed back by a server after a client initiates any request to the server; and, obtaining a response header data containing client configuration update information from the response message, wherein the response header data includes a configuration header data and a version header data; and, determining whether there is an update to a client configuration stored at the server based on the configuration header data; and, updating a corresponding configuration at the client according to the version header data, if there is an update.

Preferably, the response header data is generated by the server according to rules of response header data agreed with the client, and the method comprises the following steps:

initializing the configuration header data to a set of fixed digits, wherein a digit count of the configuration header data is determined by a count number of modules of the client configuration stored at the server, and each digit of the configuration header data represents one functional module of the client configuration stored at the server; and, setting a value of a corresponding digit in the response header data to an agreed value representing an update, when there is an update to a functional module of the client configuration stored at the server; and, setting the version header data, which consists of configuration version numbers that correspond to the functional modules of the client configuration stored at the server respectively, and a discrete request time; wherein each configuration version number represents a version number of the corresponding functional module of the client configuration stored at the server; and, updating a value of the corresponding configuration version number, when the version number of anyone of the functional modules of the client configuration stored at the server is updated; and setting the discrete request time of the functional module of the client configuration stored at the server the version number of which is updated; and, combining the configuration header data and the version header data to generate the response header data.

Preferably, the step of determining whether there is an update to a client configuration stored at the server based on the configuration header data comprises: determining whether the configuration header data contains the agreed value representing an update; and, if yes, determining that there is an update in the client configuration stored at the server.

Preferably, if there is an update, the step of updating a corresponding configuration at the client according to the version header data comprises: comparing the version header data that is newly obtained with a local response header data stored at the client to detect the functional modules that need to be updated; and, obtaining a corresponding URL to update a corresponding functional module based on the detected functional modules that need to be updated; and updating the local response header data to the version header data newly obtained. In the subsequent updating processes, new version header data continuously replaces previous version header data.

Preferably, the method for achieving timely updating of client configuration also includes: the functional modules of the client configuration stored at the server includes a switch module and a positioning module.

On the other hand, the present invention also discloses a system for achieving timely updating of client configuration, which comprises: an information receiving unit, configured to receive a response message fed back by a server after a client initiates any request to the server; an information extraction unit, configured to obtain a response header data carrying client configuration update information from the response message, wherein the response header data includes a configuration header data and a version header data; an update judgment unit, configured to determine whether there is an update to the client configuration stored at the server based on the configuration header data; and an operation unit, configured to update a corresponding configuration at the client according to the version header data, when it is determined that there is an update to the client configuration stored at the server.

Preferably, the system for achieving timely updating of client configuration further comprising a message setting unit provided at the server, wherein the message setting unit is configured to set a response header data of the response message according to rules of response header data that is agreed by the client; and, wherein the message setting unit comprises:

a first setting subunit, which is used to set the configuration header data, wherein an initial data of the configuration header data is a set of fixed digits, and a digit count of the configuration header data is determined by a count number of functional modules of the client configuration stored at the server; and each digit of the configuration header data represents a functional module of the client configuration stored at the server, and when there is an update to a functional module of the client configuration stored at the server, the first setting subunit sets a value of the corresponding digit in the configuration header data to an agreed value representing an update;

a second setting subunit, which is used to set the version header data, wherein the version header data consists of configuration version numbers and a corresponding discrete request time, wherein each configuration version number of the version header data represents a version number of a functional module of the client configuration saved at the server, and when the version number of anyone of the functional modules of the client configuration stored at the server is updated, the second setting subunit updates a value of the corresponding configuration version number, and sets the discrete request time of the functional module of client configuration stored at the server;

a response header generating subunit, which is used to combine the configuration header data and the version header data to generate the response header data.

Further preferably, the update judgment unit comprises: an update determination subunit, which is used to determine whether the configuration header data contains an agreed value representing an update; and, if yes, it is determined that there is an update in the client configuration stored at the server.

Further preferably, the operation unit comprises: a data comparison subunit, which is used to compare the version header data that is newly obtained with a local response header data that is stored at the client, and to detect functional modules that need to be updated; a module update subunit, which is used to obtain a corresponding URL to update a corresponding functional module based on the detected functional modules that need to be updated; a data replacement subunit, which is used to update the local response header data to the version header data newly obtained.

Further preferably, the functional modules of the client configuration stored at the server include a switch module and a positioning module.

The present invention has at least one of the following technical effects:

This invention is based on the frequent communication requests between the client and the server, and achieves timely updating of the client configuration through a rule of response header data agreed between the server and the client. When the client sends any request to the server, and when it is detected that the configuration has been updated, the updated information can be immediately sent to the client through the response header. The approach is simple and the process is efficient.

The present invention can achieve updating without restarting the device or application program and improves the user experience.

The response header data agreed upon by the present invention includes a configuration header and a version header. Through the configuration header, it can be determined whether there is an update in the client configuration. If there is an update, the change of in the version header can be used to determine which module needs to be updated. If there is no update, no subsequent steps are required, avoiding unnecessary cumbersome steps.

The present invention defines rules of the response header data that each digit of the data corresponds to a module. This configuration allows the system to quickly determine which module has an update based on changes in the data, and then allows the client to quickly obtain the update URL of the module.

BRIEF DESCRIPTION OF THE DRAWINGS

To illustrate the technical solutions more clearly in the embodiments of the present application, a brief introduction will be given below to the drawings needed to be used in the description of the embodiments. Obviously, the drawings in the following description are only some embodiments of the present application. Those of ordinary skill in the art can also obtain other drawings based on these drawings without exerting any creative effort.

FIG. 1 is a flow chart of Embodiment 1 of the method for achieving timely updating of client configuration according to the present invention.

FIG. 5 is a flow chart of achieving a first configuration updating of the client in Embodiment 5.

FIG. 6 is a flow chart of achieving a subsequent configuration updating of the client in Embodiment 5.

DESCRIPTION OF THE ILLUSTRATED EMBODIMENTS

Figure 2:
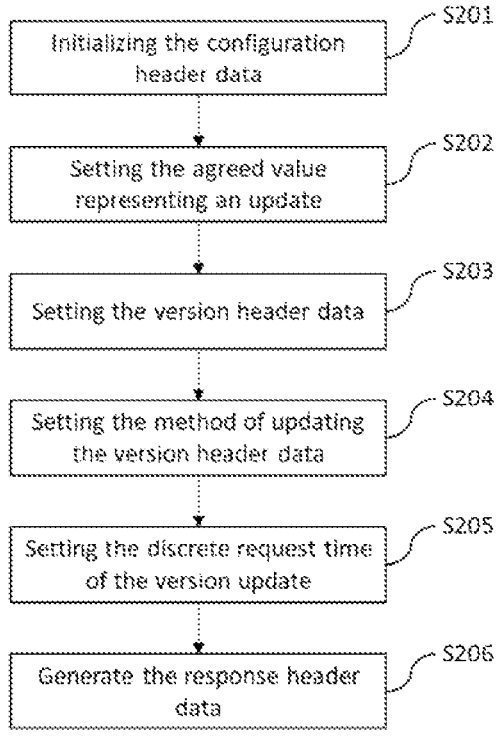
FIG. 2 is a flow chart of Embodiment 2 of the method for achieving timely updating of client configuration according to the present invention.

To explain the embodiments of the present invention or the technical solutions in the prior arts more clearly, the drawings needed to be used in the description of the embodiments or the prior arts will be briefly introduced below. Obviously, the following description and the drawings are illustrative and should not be construed as limiting the invention. The following description describes numerous specific details to facilitate an understanding of the invention. In some instances, however, well-known, or conventional details are not shown to maintain conciseness in the description.

Embodiment 1

Embodiment 1 of the present invention is shown in FIG. 1, which provides a method for achieving timely updating of client configuration that comprises the following steps.

S101. Receiving a response message fed back by a server, after a client initiates any request to the server.

Specifically, in this embodiment, the specific content of the request sent by the client to the server is not limited. Since HTTP requests between the client and the server are relatively frequent, such as, when the user clicks on an APP at the client, the client will initiate an HTTP request to the server. Therefore, such an HTTP request is not limited to a request for a configuration update. It is more likely that it does not contain a configuration update request, but rather just a frequent communication request between the client and the server.

S102. Obtaining a response header data containing client configuration update information from the response message. The response header data includes configuration header data and version header data.

Specifically, during an HTTP request process between the client and the server, if the client configuration need to be updated, the server can insert response header data containing the client configuration update information in the response message fed back to the client, ensuring that, if there is a need to update the configuration, the update information can be fed back timely to the client. The configuration header data indicates whether the client's configuration should be updated, and the version header data indicates which module of the client should be updated. For example, when network maintenance personnel discovers that the software's positioning data has a deviation and updated the positioning data, but the user has not triggered the positioning service for the time being, so that the HTTP request of the client sent to the server does not include a positioning update request, the server can still feedback a positioning update information to the software client, so that the client can timely update the positioning data based on the response header data.

S103: Determining whether the client configuration stored at the server is updated based on the configuration header data.

Specifically, in the obtained response header data, it is first determined whether the configuration header data has changed. If there is a change, then based on the changed data, it is determined whether the client configuration stored at the server has been updated.

S104. If there is an update, update the corresponding configuration at the client according to the version header data.

Specifically, after it is determined that there is an update in the client configuration, it is determined which module of the client has an update based on the change in the version header data, and then the configuration at the client is updated.

Embodiment 1 discloses a method for achieving timely updating of client configuration. First, after the client initiates any request to the server, it receives a response message fed back by the server, and obtains the response header data containing the client configuration update information from the response message. The response header data includes a configuration header data and a version header data. Based on the configuration header data, it is determined whether there is an update in the client configuration stored at the server. If there is an update, then based on the version header data, the corresponding configuration at the client is updated. Compared with the current methods, whereby, when it is necessary to adjust the configuration information of the client, it is usually required to restart the application service at the client, or to be triggered by a specific front-end operation, or to be triggered by a scheduled task, the embodiment of the present invention is based on the frequent communication between the client and the server. Based on the HTTP request, the client configuration update information is fed back to the client in real time through rules of the response header data agreed between the server and the client, improving the efficiency of client configuration updating and ensuring the timeliness of client configuration updating.

Embodiment 2

Based on the above-mentioned Embodiment 1, Embodiment 2 of the present invention provides a detailed description of a method for generating response header data, as shown in FIG. 2. Specifically, the response header data is generated by the server according to rules of response header agreed with the client. The method comprises the following steps.

S201. Setting the initial data of the configuration header data to a set of fixed digits. The form of the fixed digits may include a binary form, a decimal form, such as "00000", "2222222", etc., which is not limited in this embodiment of the present invention. The number of digits in the configuration header data is determined by the number of modules of the client configuration stored at the server. For example, the number of modules of the client configuration stored at the server is 10, then the initial data can be "0000000000" or "2222222222", wherein each digit of the configuration header data represents one of the functional modules of the client configuration stored at the server respectively.

S202. Setting a value that is agreed to represent an update. When there is an update to a functional module of the client configuration stored at the server, the corresponding digit in the response header data is set to a value agreed to represent an update. The value agreed to represent an update has various forms, including numbers, letters, symbols, such as 1, +, a, etc., which are not limited in this embodiment of the present invention.

S203. Setting the version header data. The version header data consists of "configuration version numbers" of the functional modules of the client configuration stored at the server and a corresponding "discrete request time". Each digit of the configuration version number represents a version number of a corresponding functional module of the client configuration stored at the server. Therefore, the number of digits in the configuration version number is the same as the number of digits in the configuration header data and corresponds to each other. The configuration version number can be in various forms, including a set of numbers, a set of letters, and a set of symbols.

S204. Setting the method for updating the version header data. When the version of any functional module of the client configuration stored at the server is updated, the value of the corresponding digit in the configuration version number is updated. There are various ways to update the value, and the principle is that it should not repeat the previous version number. For example, when a certain module is updated, the value of the corresponding digit of the number is increased by 2. This embodiment of the invention does not limit these ways.

S205. Setting the discrete request time for the functional module of the client configuration stored at the server that has a version update.

S206. Combining the configuration header data and the version header data to generate the response header data.

For example, the initial data of the configuration header data is set to "22222222", and the version header data is set to "2, 2, 2, 2, 2, 2, 2, 2, 1". When a module of the client configuration corresponding to a digit of the configuration header data has an update, it is agreed that the value of the configuration header data representing an update is 1, and the digit corresponding to the configuration version number in the version header data is added by 2, then the configuration header data becomes "22222221", and the version header data becomes "2, 2, 2, 2, 2, 2, 2, 4, 10".

A set of response header data is generated as:

"22222221, 2, 2, 2, 2, 2, 2, 2, 4, 10".

After the client sends any request to the server, the server generates the response header data according to the rules of response header data. The response message fed back by the server carries the response header data. According to the obtained response header data containing the configuration update information, it can be determined that there is an update to the client configuration. By comparing the version header data with the local response header data stored at the client, the modules that need a configuration updating can be determined, so that the client can obtain a corresponding URL to update the configuration.

Embodiment 3

Figure 3:
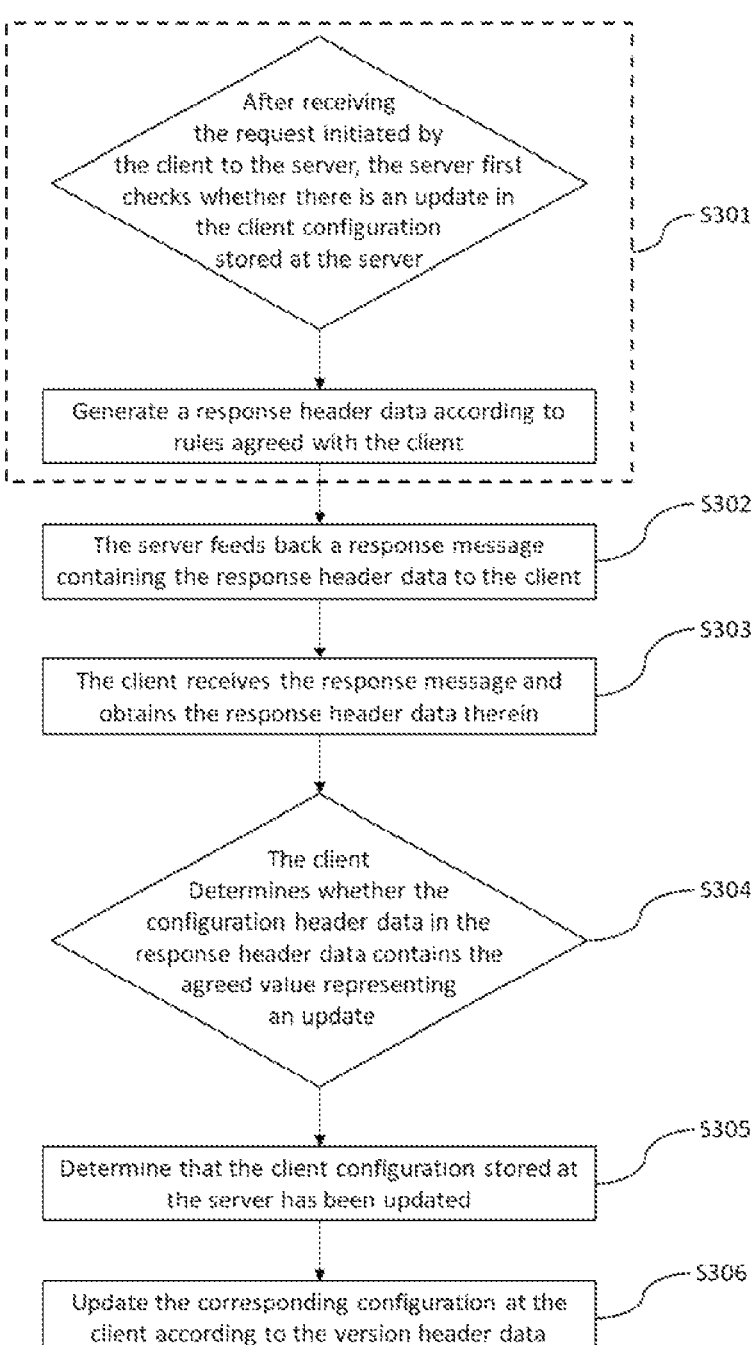
FIG. 3 is a flow chart of Embodiment 3 of the method for achieving timely updating of client configuration according to the present invention.

Based on the above-mentioned Embodiment 2, Embodiment 3 of the present invention provides a detailed description of how to determine whether there is an update in the client configuration. The method for updating client configuration in this embodiment is shown in FIG. 3. Specifically, it comprises the following steps.

S301. After receiving the request initiated by the client to the server, the server first checks whether there is an update in the client configuration stored at the server. If there is an update, it generates a response header data according to the rules agreed with the client. The response header data includes a configuration header data and a version header data. Specifically, the generation of the response header data has been described in detail in Embodiment 2 and will not be repeated.

S302. The server sends a response message containing the above-mentioned response header data to the client as feedback.

S303. The client receives the response message and obtains the response header data from the response message.

S304. The client determines whether the configuration header data in the response header data contains the agreed value representing an update. For example, when the agreed value representing an update is 1, then it is needed to determine whether the configuration header data contains 1.

S305. When it is determined that the configuration header data contains the agreed value, it can be known that the client configuration stored at the server has been updated. For example, if the configuration header data contains 1, the client configuration stored at the server has been updated.

S306. If there is an update, then the corresponding configuration at the client is updated according to the version header data.

In this embodiment, if there are updates to multiple configuration modules, then the configuration header data will be detected to contain multiple 1's, indicating that there are updates to multiple modules of the client configuration stored at the server.

Embodiment 4

Figure 4:
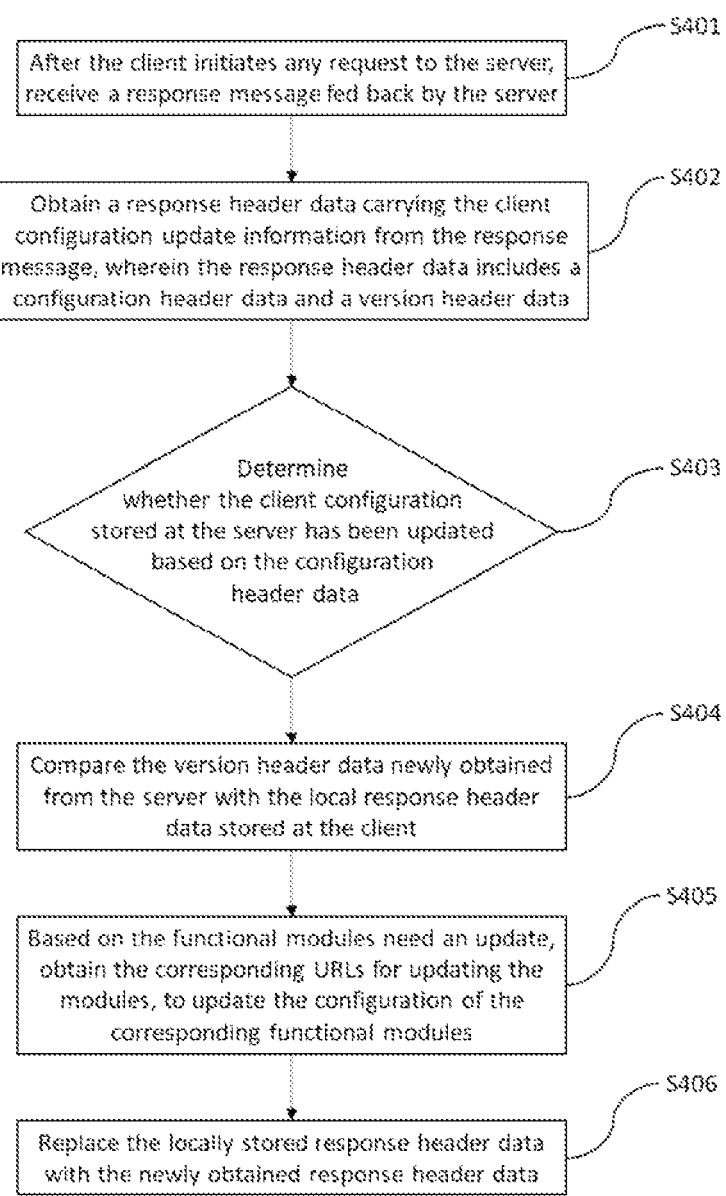
FIG. 4 is a flow chart of Embodiment 4 of the method for achieving timely updating of client configuration according to the present invention.

Based on the above-mentioned Embodiment 1, Embodiment 4 of the present invention provides a detailed description of how to update the configuration at the client according to the version header data. Specifically, as shown in FIG. 4, it includes the following steps.

S401. After the client initiates any request to the server, it receives the response message fed back by the server.

S402. Obtain a response header data carrying the client configuration update information from the response message, wherein the response header data includes a configuration header data and a version header data.

S403. Determine whether the client configuration stored at the server has been updated based on the configuration header data. If yes, then proceed to the next step.

S404. Obtain the local response header data stored at the client, and compare the version header data newly obtained from the server with the local response header data stored at the client, and detect the modules that require a configuration update.

S405. Based on the functional modules that need to be updated, the client obtains the corresponding URLs for updating the modules, to update the configuration of the corresponding functional modules.

S406. Replace the locally stored version header data with the newly obtained version header data.

For example, when a user clicks on an application at the client, the client sends an HTTP request to the server. Before the server returns a response, the server first checks whether there is an update to the client configuration stored at the server. For example, if the server detects that a switch module of the client configuration is updated, then a response header data is generated according to the rules of the response header data agreed by both parties:

"Configuration header data: 11111112,

Version header data: 1, 1, 1, 1, 1, 1, 1, 2, 1", which is fed back to the client. After obtaining this set of response header data, the client first determines that the client configuration is updated based on the configuration header data, and then obtains the local version header data "1, 1, 1, 1, 1, 1, 1, 1, 1", which is stored at the client, and compares this with the newly obtained version header data "1, 1, 1, 1, 1, 1, 1, 2, 1". Whereby it is detected that a single digit of the configuration version number is increased by 1, and the module corresponds to this single digit is the switch module. Thus, the switch module is determined as the configuration module that needs to be updated. The client then obtains the update URL of the switch module to carry out the updating, and save the data "1, 1, 1, 1, 1, 1, 1, 2, 1" to the local storage to replace the data "1, 1, 1, 1, 1, 1, 1, 1, 1".

Embodiment 5

Figure 5:
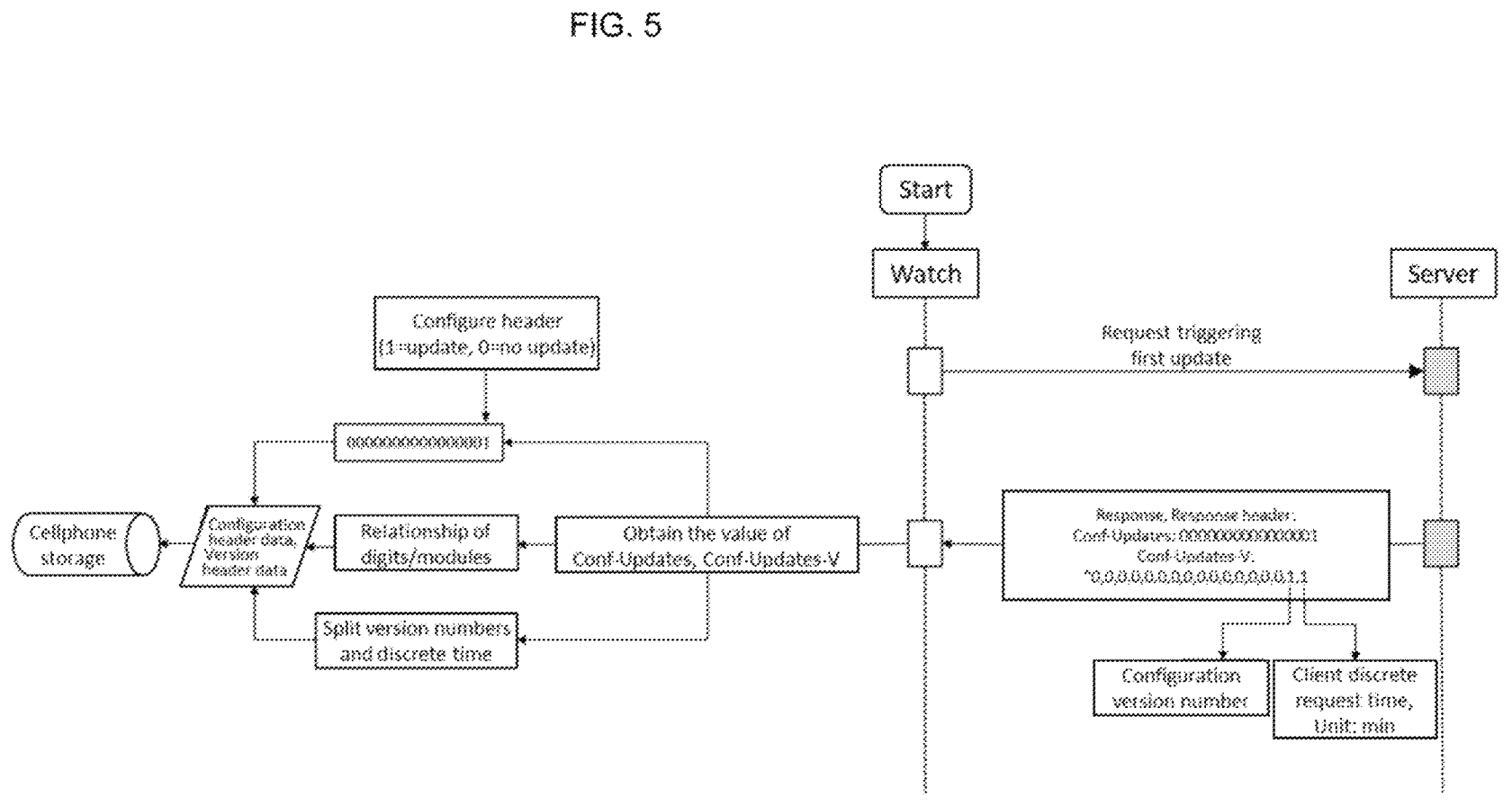

The flow chart of achieving a first client configuration updating in Embodiment 5 of the present invention is shown in FIG. 5, which includes the following steps.

(1) After initiating any request to the server, the client receives a response message fed back by the server.

The client in this embodiment is a smart watch. The smart watch sends a request to the server, and the server feeds back a response message.

(2) Obtain a response header data carrying client configuration update information from the response message, wherein the response header data includes a configuration header data and a version header data.

In this embodiment, specifically, the response header data is generated by a response header data rule agreed between the server and the client. The response header data rule specifically comprises the following two parts.

A configuration header data "Conf-Updates": initialized to a 16-bit binary form data "0000000000000000". Each bit corresponds to a configuration module. An agreed value 1 means that the module data has been updated, and 0 means no update is required.

And a version header data Conf-Updates-V: consisting of 16 groups of "configuration version numbers" plus 1 group of "discrete request time", separated by commas. Each group corresponds to a module, and the initialized data is set to "0, 0, 0, 0, 0, 0, 0, 0, 0, 0, 0, 0, 0, 0, 0, 1". When a module configuration needs to be updated, the configuration version number of the corresponding group will be added by 1, and the discrete request time will be reset.

The relationship between the binary bits and the modules is listed in the following table (the position of the binary bits is from right to left, and the corresponding modules are illustrative).

TABLE 1

Relationship table between binary bits and modules

| Position of bits | Corresponding modules | Obtained configuration URL |
|---|---|---|
| 1 | switch | https://getSwitchConfig |
| 2 | position | https://getLocationConfig |
| 3 | . . . | |

When the configuration of the switch module needs to be updated at the client:

The original configuration header data is, Conf-Updates=0000000000000000. Set the value of the corresponding bit of the switch module to 1, to get 0000000000000001. That is, the new configuration header data is Conf-Updates=0000000000000001.

The original version header data is, Conf-Updates-V="0, 0, 0, 0, 0, 0, 0, 0, 0, 0, 0, 0, 0, 0, 0, 1". Add 1 to the version number corresponding to the switch module, and then set the discrete request time. The new value is "0, 0, 0, 0, 0, 0, 0, 0, 0, 0, 0, 0, 0, 0, 1, 1".

The response header data obtained is:

"0000000000000001, 0, 0, 0, 0, 0, 0, 0, 0, 0, 0, 0, 0, 0, 0, 1, 1".

(3) Determine whether the client configuration stored at the server has been updated based on the configuration header data.

For an embodiment of the present invention, it may specifically include: determine whether the configuration header data contains 1.

For the embodiment of the present invention, it may further include: if the configuration header data contains 1, it can be determined that the client configuration stored at the server is updated.

(4) If there is an update, update the corresponding configuration at the client according to the version header data.

For an embodiment of the present invention, it specifically includes: splitting the configuration version numbers and the discrete request time of the version header data, and according to the relationship between the configuration version numbers and the modules stored at the client, determining that the module that needs a configuration update is the switch module.

Further, the client obtains the URL for updating the switch module to carry out the updating, and at the same time, saves the newly obtained version header data.

Figure 6:
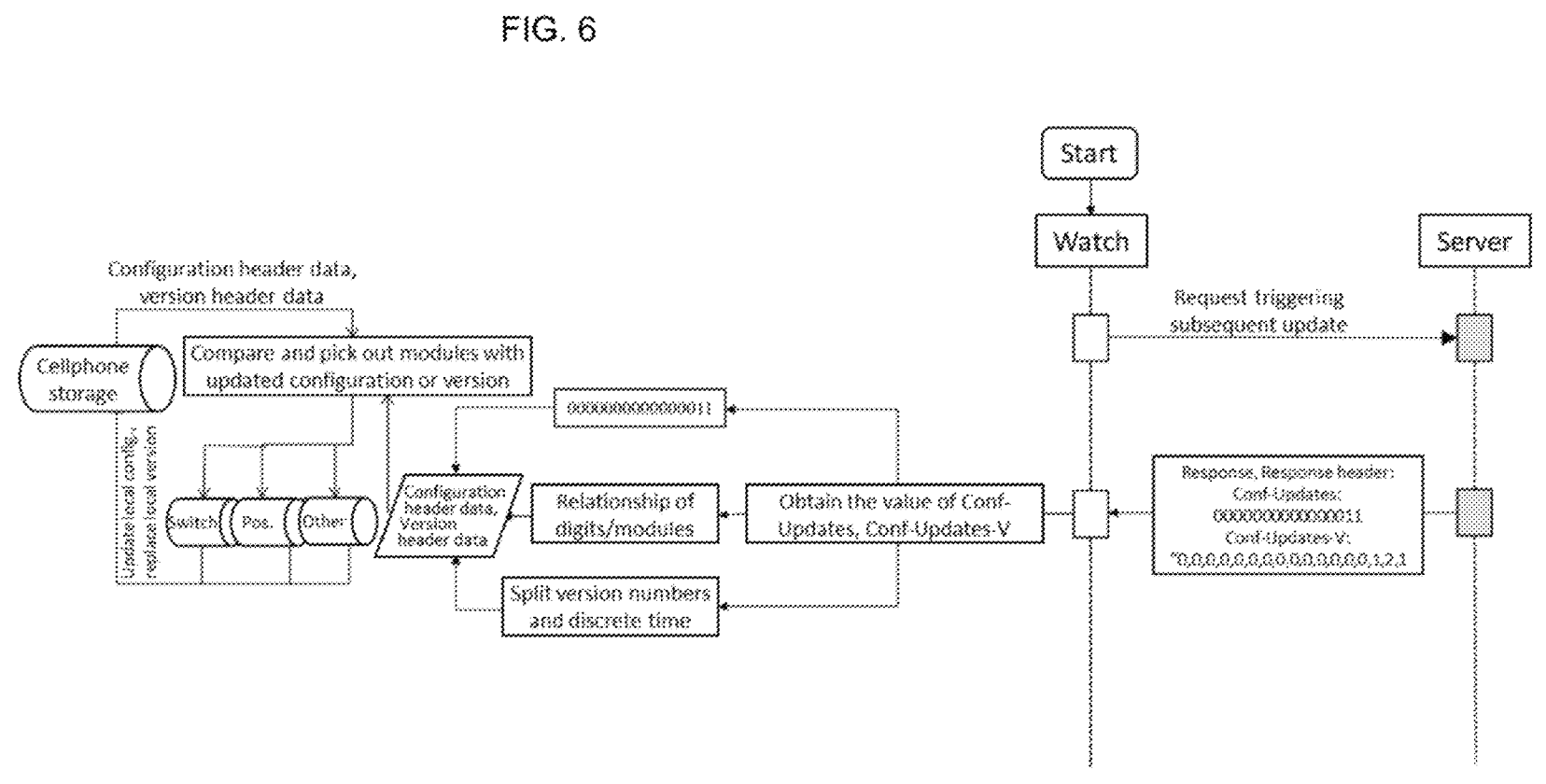

FIG. 6 is a schematic flowchart of a subsequent configuration updating of the client in Embodiment 5, including the following steps.

(1) After initiating any request to the server, the client receives a response message fed back by the server.

The client in this embodiment is a smart watch. The smart watch sends a request to the server, and the server feeds back a response message.

(2) Obtain a response header data carrying client configuration update information from the response message, wherein the response header data includes a configuration header data and a version header data.

In this embodiment, specifically, the response header data is generated by a rule of response header data agreed between the server and the client. The rule of response header data specifically includes the following two parts.

A configuration header data "Conf-Updates": initialized to a 16-bit binary form data "0000000000000000". Each bit corresponds to a configuration module. When the agreed value is 1, it means that the module data has been updated, and 0 means no update is required.

And a version header data "Conf-Updates-V": consisting of 16 groups of "configuration version number" plus 1 group of "discrete request time", separated by commas. Each group corresponds to a module, and the initialized data is set to "0, 0, 0, 0, 0, 0, 0, 0, 0, 0, 0, 0, 0, 0, 0, 1". When a configuration module needs to be updated, the configuration version number of the corresponding group is added by 1, and the discrete request time is accordingly set.

The relationship between the binary bits and the modules is shown in Table 1. When the configurations of the switch module and the positioning module need to be updated at the client:

The original configuration header data is, Conf-Updates=0000000000000000. Set the value of the corresponding bits of the switch module and the positioning module to 1, to get 0000000000000011. That is, the new configuration response header is Conf-Updates=0000000000000011.

The original version header data is, Conf-Updates-V="0, 0, 0, 0, 0, 0, 0, 0, 0, 0, 0, 0, 0, 0, 1, 1". The configuration version numbers corresponding to the switch module and the positioning module are added by 1, and then the discrete request time is set. The new value is "0, 0, 0, 0, 0, 0, 0, 0, 0, 0, 0, 0, 0, 0, 1, 2, 1". The response header data obtained is:

"0000000000000011, 0, 0, 0, 0, 0, 0, 0, 0, 0, 0, 0, 0, 0, 0, 1, 2, 1".

(3) Determine whether the client configuration stored at the server has been updated based on the configuration header data.

For an embodiment of the present invention, it may specifically include: determining whether the configuration header data contains 1.

For the embodiment of the present invention, it may further include: if the configuration header data contains 1, then it is determined that the client configuration stored at the server is updated.

(4) If there is an update, update the corresponding configuration at the client according to the version header data.

Specifically, it includes: obtaining the local response header data stored at the client, and comparing the obtained new version header data with the local response header data stored at the client.

The modules that need to be configured and updated are detected as being the switch module and the positioning module. The client obtains the corresponding URLs for updating the corresponding modules to carry out the updating, and at the same time replaces the locally stored version header data with the new version header data.

Embodiment 6

Figure 7:
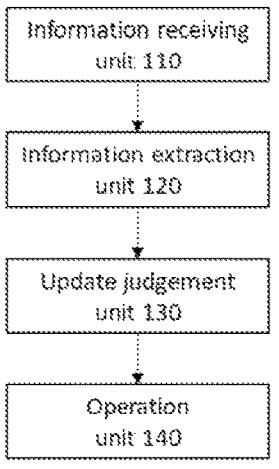
FIG. 7 is a structural block diagram of Embodiment 6 of the system for achieving timely updating of client configuration according to the present invention.

Based on the same technical concept, Embodiment 6 of the present invention discloses a system for achieving timely updating of client configuration, as shown in FIG. 7, including the following units.

An information receiving unit 110 is used to receive a response message fed back by the server after the client initiates any request to the server. Specifically, since HTTP requests between the client and the server are relatively frequent, when the client sends a request to the server, the server needs to give feedback upon this request, and the feedback information is received by the information receiving unit 110.

An information extraction unit 120 is configured to obtain a response header data carrying client configuration update information from the response message. The response header data includes a configuration header data and a version header data. Specifically, the response message fed back by the server contains not only the client configuration update information, but also a lot of other important information. Therefore, the information extraction unit 120 is required to extract the client configuration update information. For example, if the user wants to delete certain information, the client will send a request to delete the information to the server, and the configuration of a positioning module of the client happens to need an updating. In such a case, the response message fed back by the server to the client contains both a response header with the update information of the positioning module and the response to the request to delete the information. The information extraction unit 120 only needs to obtain the response header data containing the update information of the positioning module.

An update judgment unit 130 is used to determine whether the client configuration stored at the server is updated according to the configuration header data. Specifically, after obtaining the configuration header data, it can be determined whether the configuration header data contains the agreed value representing an update. If the configuration header data contains the agreed value representing an update, it is determined that the client configuration stored at the server is updated.

An operation unit 140 is configured to update the corresponding configuration at the client according to the version header data when it is determined that the client configuration stored at the server has been updated. Specifically, after determining that the client configuration has been updated, it is detected which module or modules need to be updated according to the version header data that is received and then the client obtains the update URLs for the modules to carry out the updating.

Embodiment 7

Figure 8:
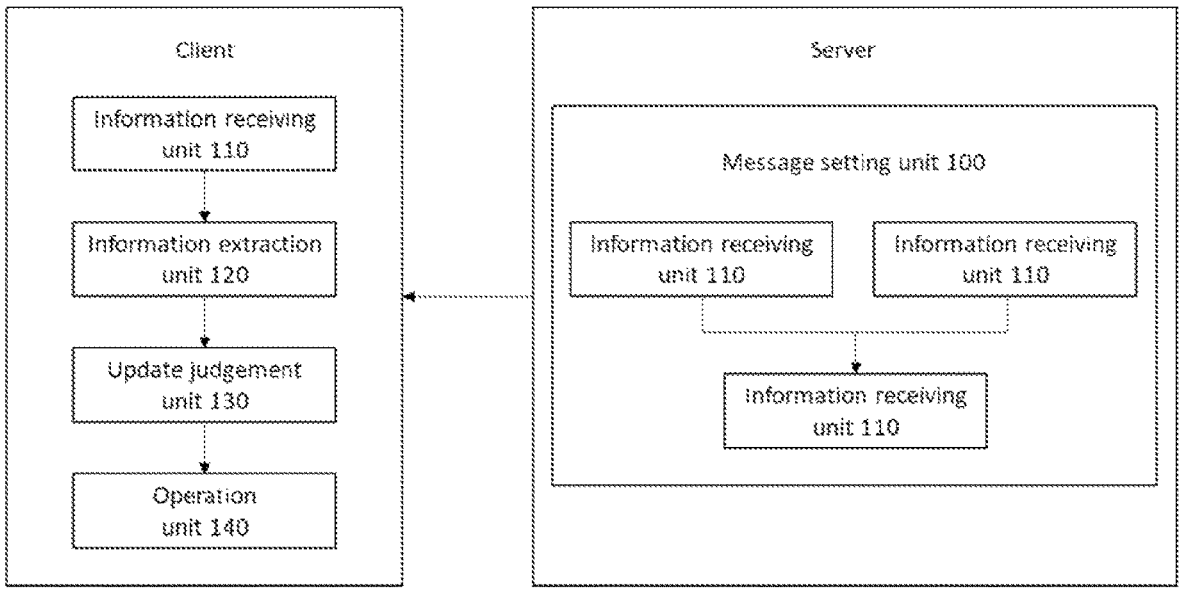
FIG. 8 is a structural block diagram of Embodiment 7 of the system for achieving timely updating of client configuration according to the present invention.

Embodiment 7 of the present invention is shown in FIG. 8. Based on the above-mentioned Embodiment 6, Embodiment 7 further includes a message setting unit 100 that is provided at the server. The message setting unit 100 is used to set the response header data of the response message according to agreed rules of the response header data. The message setting unit 100 mainly includes the following subunits.

A first setting subunit 101 is used to set the configuration header data and the value that is agreed to represent an update, so that the client can subsequently determine whether the configuration stored at the server has been updated. Specifically, first an initial date of configuration header data is set. The form of this initial data may be a binary form, a decimal form, such as "00000", "2222222", etc., which is not limited in this embodiment. The number of digits in the configuration header data corresponds to the number of client configuration modules stored at the server. That is, the number of digits in the initial data of the configuration header data is determined by how many modules are stored at the server. For example, the number of client configuration modules stored at the server is 10, then the initial data can be "0000000000" or "2222222222". And, a value representing an update is defined, the form of which includes numbers, letters, and symbols. When there is an update to a functional module of the client configuration stored at the server, the first setting subunit 101 sets the value of the corresponding digit in the response header data to the agreed value representing an update.

A second setting subunit 102 is used to set the version header data and the method to update the version header data. Specifically, the version header data is composed of two parts, namely "configuration version numbers" and a "discrete request time". The number count of the configuration version numbers is the same as the number of functional modules of the client configuration stored at the server. Each configuration version number represents the version number of a functional module of client configuration stored at the server. The form of the version numbers can be a set of numbers, a set of letters, or a set of symbols.

At the same time, the method to update the version header data is set. When the version of any of the functional modules of client configuration stored at the server is updated, the value of the corresponding number in the version header data will be updated. For example, when a certain module is updated, the corresponding number is added by 2. When the version of any of the functional modules of client configuration stored at the server is updated, the second setting subunit 102 updates the value of the corresponding number in the configuration version number and sets the discrete request time of the functional module of client configuration stored at the server.

A response header generation subunit 103 is configured to combine the configuration header data and the version header data to generate the response header data. Specifically, the response header data set by the first setting subunit 101 and the version header data set by the second setting subunit 102 are merged into two rows of response header data.

The first setting subunit 101 and the second setting subunit 102 are connected to the response header generating subunit 103, and the message setting unit 100 is connected to the information accepting unit 110.

Embodiment 8

Figure 9:
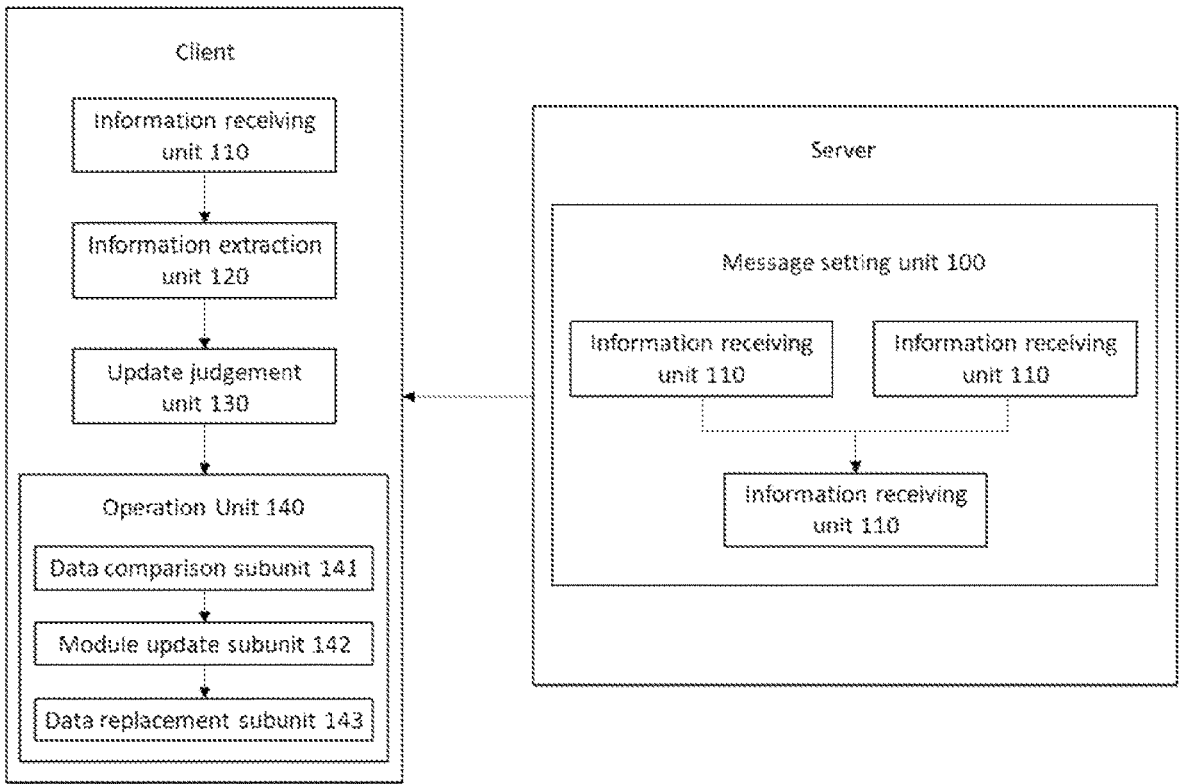
FIG. 9 is a structural block diagram of Embodiment 8 of the system for achieving timely updating of client configuration according to the present invention.

Embodiment 8 of the present invention is shown in FIG. 9. Based on the above-mentioned Embodiment 6 or 7, the operation unit 140 further includes the following subunits.

A data comparison subunit 141 is used to compare the obtained new version header data with the local version header data stored at the client. Specifically, the locally stored version header data is obtained for comparison with the new version header data, to determine which number has a change in the value.

A module update subunit 142 is used to pick out the functional modules that need to be configured, so that the client can obtain the corresponding URLs and update the configuration of the corresponding functional modules. Specifically, after obtaining the position of digits with changed data, according to the relationship between the positions of digits and the modules, it is determined which module has an update, and the client then obtains the update URL of this module and carry out the updating of the corresponding configuration.

A data replacement subunit 143 is used to update the local response header data to the new version header data. Specifically, the new response header data is stored locally to replace the old local response header data.

The system embodiments of the present invention correspond to the method embodiments. The technical details of the method embodiments in this application are also applicable to the system embodiments of this application. To reduce repetition, these will not be described again.

Although the preferred embodiments of the present application have been described, those skilled in the art will be able to make additional changes and modifications to these embodiments once the basic inventive concepts are understood. Therefore, it is intended that the appended claims be construed to include the preferred embodiments and all changes and modifications that fall within the scope of this application.

Obviously, those skilled in the art can make various changes and modifications to the present application without departing from the spirit and scope of the present application. In this way, if these modifications and variations of the present application fall within the scope of the claims of the present application and equivalent solutions, the present application is also intended to include these modifications and variations.

The invention claimed is:

1. A method for achieving timely updating of client configuration, comprising:

receiving a response message fed back by a server after a client initiates any request to the server;

characterized by further comprising steps:

obtaining a response header data containing client configuration update information from the response message, wherein the response header data includes a configuration header data and a version header data; and, determining an update to a client configuration is stored at the server based on the configuration header data; and, updating a corresponding configuration at the client according to the version header data;

wherein the response header data is generated by the server according to rules of response header data agreed with the client, and the method comprises steps:

initializing the configuration header data to a set of fixed digits, wherein a digit count of the configuration header data is determined by a count number of modules of the client configuration stored at the server, and each digit of the configuration header data represents one functional module of the client configuration stored at the server; and, setting a value of a corresponding digit in the response header data to an agreed value representing an update; and, setting the version header data, which consists of configuration version numbers that correspond to the functional modules of the client configuration stored at the server respectively, and a discrete request time of the client: wherein each configuration version number represents a version number of the corresponding functional module of the client configuration stored at the server; and, updating a value of the corresponding configuration version number, when the version number of any one of the functional modules of the client configuration stored at the server is updated; and setting the discrete request time; and, combining the configuration header data and the version header data to generate the response header data.

2. The method for achieving timely updating of client configuration according to claim 1, characterized in that, the step, determining an update to a client configuration is stored at the server based on the configuration header data, comprises:

determining whether the configuration header data contains the agreed value representing an update.

3. The method for achieving timely updating of client configuration according to claim 1, characterized in that, the step, updating a corresponding configuration at the client according to the version header data, comprises:

comparing the response header data that is newly obtained with a local response header data stored at the client to detect functional modules that need to be updated; and, obtaining a corresponding URL to update a corresponding functional module based on the detected functional modules that need to be updated; and updating the local response header data to the response header data newly obtained.

4. The method for achieving timely updating of client configuration according to claim 1, characterized in that, the functional modules of the client configuration stored at the server includes a switch module and a positioning module.

* * * * *